(12) United States Patent
Bauer et al.

(10) Patent No.: US 12,500,469 B2
(45) Date of Patent: Dec. 16, 2025

(54) STATOR FOR AN ELECTRIC DRIVE UNIT AND METHOD FOR PRODUCING A STATOR FOR AN ELECTRIC DRIVE UNIT

(71) Applicant: Bühler Motor GmbH, Nuremberg (DE)

(72) Inventors: Jochen Bauer, Ergersheim (DE); Klaus Weiske, Altdorf (DE); Stephan Kach, Neunkirchen am Brand (DE); Oliver Gloge, Rottweil (DE); Andreas Leinberger, Zirndorf (DE); Andreas Schnurrer, Nuremberg (DE); Johann Traut, Fürth/ Burgfarrnbach (DE); Jürgen Brettschneider, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 205 days.

(21) Appl. No.: 18/410,471

(22) Filed: Jan. 11, 2024

(65) Prior Publication Data

US 2024/0146143 A1    May 2, 2024

Related U.S. Application Data

(63) Continuation-in-part of application No. PCT/DE2022/200144, filed on Jun. 28, 2022.

(30) Foreign Application Priority Data

Jul. 15, 2021   (DE) ..................... 10 2021 207 552.5

(51) Int. Cl.
*H02K 3/02* (2006.01)
*B21F 3/02* (2006.01)
(Continued)

(52) U.S. Cl.
CPC ............... *H02K 3/522* (2013.01); *B21F 3/02* (2013.01); *H02K 15/095* (2013.01); *H02K 2203/12* (2013.01)

(58) Field of Classification Search
CPC .......... B21F 3/02; H02K 3/522; H02K 15/095
See application file for complete search history.

(56) References Cited

U.S. PATENT DOCUMENTS 10,211,695 B2 * 2/2019 Roos ..................... H02K 3/522
2017/0331342 A1 11/2017 Beetz et al.
(Continued)

FOREIGN PATENT DOCUMENTS

DE    102013114688 A1 * 6/2015 ............. H02K 5/225
DE    10 2017 101 073 A1    7/2018
(Continued)

OTHER PUBLICATIONS

DE-102013114688-A1 machine translation Sep. 30, 2025.*
(Continued)

*Primary Examiner* — Leda T Pham
(74) *Attorney, Agent, or Firm* — WHDA, LLP

(57) ABSTRACT

A stator for an electric drive unit, in particular an electric motor, and to a method for the production thereof. The stator for the electric drive unit comprises a stator core having at least one stator pole; a stator winding which forms all coils from a continuous winding wire; at least one insulating cap, on which a plurality of contact receiving pockets are arranged for receiving the winding wire; a number of deflection domes which are distributed on the outer lateral surface of the cap; and wire guiding contours at the outer lateral surface of the insulting cap for spacing the winding wire; wherein the plurality of contact receiving pockets each have a receiving region for the winding wire which has a
(Continued)

different design, and wherein the plurality of contact receiving pockets comprise at least one deflection balcony.

15 Claims, 4 Drawing Sheets

(51) Int. Cl.
*H02K 3/52* (2006.01)
*H02K 15/095* (2006.01)

(56) References Cited

U.S. PATENT DOCUMENTS

| | | |
|---|---|---|
| 2018/0241273 A1 | 8/2018 | Beetz et al. |
| 2019/0199156 A1* | 6/2019 | Bernreuther ............. H02K 1/16 |
| 2020/0067367 A1 | 2/2020 | Braun et al. |
| 2020/0076259 A1 | 3/2020 | Hackl et al. |
| 2021/0288546 A1 | 9/2021 | Wießmann et al. |
| 2022/0231568 A1* | 7/2022 | Obendorfer ............. H02K 3/28 |

FOREIGN PATENT DOCUMENTS

| | | |
|---|---|---|
| DE | 10 2017 206 845 A1 | 10/2018 |
| DE | 10 2017 223 519 B3 | 10/2018 |
| DE | 10 2018 214 111 A1 | 2/2020 |
| EP | 3 618 229 A1 | 3/2020 |
| WO | 2016/124636 A1 | 8/2016 |
| WO | 2019/215031 A1 | 11/2019 |
| WO | 2020/225248 A1 | 11/2020 |

OTHER PUBLICATIONS

International Search Report dated Oct. 10, 2022, issued in counterpart International Application No. PCT/DE2022/200144. (2 pages).
First Office Action dated Apr. 5, 2022, issued in counterpart of German Patent Application No. 10 2021 207 552.5. (6 pages).

* cited by examiner

STATOR FOR AN ELECTRIC DRIVE UNIT AND METHOD FOR PRODUCING A STATOR FOR AN ELECTRIC DRIVE UNIT

CROSS-REFERENCE TO RELATED APPLICATIONS

This present patent application is based on and claims priority to PCT Application No. PCT/DE2022/200144 filed on Jun. 28, 2022, which is based on German Application No. DE 10 2021 207 552.5 filed on Jul. 15, 2021, all of which are incorporated by reference in their entirety.

BACKGROUND OF THE INVENTION

(1) Field of the Invention

The invention relates to a stator for an electric drive unit and to a method for manufacturing a stator for an electric drive unit.

(2) Description of Related Art Including Information Disclosed Under 37 CFR 1.97 and 1.98

Electric motors, preferably brushless electric motors, are used in numerous applications in the automotive sector, for example as drives for liquid pumps. Typically, such brushless electric motors comprise a stator with wound stator poles that form the coils and accomplish a contacting with a coil wire or a plurality of coil wires by means of insulation displacement contacts. When the coil wire is inserted into receiving pockets for insulation displacement contacts, the wire is subjected to tensile stress. Setting the insulation displacement contacts increases the tensile stress on the coil wire, with the result that damage to the coil wire can occur, which in turn has negative effects on the contacting. In addition, when setting or pressing in the insulation displacement contacts there is a risk that the coil wire may lie off-center in the receiving pocket and not be correctly contacted with the insulation displacement contact. A further risk is that the coil wire contacted by the insulation displacement contact can slip out of the insulation displacement contact under the influence of a change of temperature.

BRIEF SUMMARY OF THE INVENTION

The object of the invention is to have a stator for an electric drive unit and a method for manufacturing a stator for an electric drive unit, in which a reliable contacting of the continuous coil wire is ensured, relative movements between the continuous coil wire and the insulation displacement contacts are reduced and, in the method for manufacturing a stator, a slack in the wire is generated in order to thereby reduce the wire tension at the contact point of the coil wire and the insulation displacement contact when subjected to temperature change.

Within the meaning of the invention, a stator for an electric drive unit, in particular an electric motor, is proposed, comprising a stator core with at least one stator pole; a stator winding, which forms all the coils from one continuous coil wire; at least one insulating cap on which a plurality of contact receiving pockets is arranged for receiving the coil wire; a number of deflection domes which are arranged and distributed over the circumference of the insulating cap; and wire guide contours on the outer peripheral surface of the insulating cap for spacing the coil wire, the plurality of contact receiving pockets having a receiving region for the coil wire, which receiving region is designed differently, and the plurality of contact receiving pockets comprising at least one deflection balcony (raised part of the pocket).

The electric drive according to the invention is designed in particular as a three-phase brushless electric motor with nine stator poles. However, a different number of stator poles, known to a person skilled in the art, is also possible. The stator core with at least one stator pole is formed from a stamped laminated core. The at least one insulating cap is applied or mounted on the stator core as an injection-molded part. A plurality of contact receiving pockets and a number of deflection domes are arranged on the at least one insulating cap in the axial direction. In addition, wire guide contours for spacing the coil wire run on the outer peripheral surface of the at least one insulating cap. The wire guide contours prevent the phase wires from touching and thus short-circuiting. The plurality of contact receiving pockets has a receiving region for the coil wire which is designed differently. The individual contact receiving pockets are designed differently as a result. In addition, the individual contact receiving pockets comprise at least one deflection balcony, which is formed on a radial inner surface and/or outer surface of the contact receiving pockets. By providing the deflection balconies, the level of the base of the pocket of the wire support (on the support region) is increased relative to the height of the pocket base at the wire entry. The distance to the deflection is increased.

In a preferred development of the invention, the receiving regions of the contact receiving pockets comprise an upper and a lower elastic subregion. In this context, elastic can mean that the subregions are for example made of an elastic material or are designed to be elastically flexible. The entire contact receiving pocket can also be designed to be elastically flexible.

In addition, the receiving region between the upper and the lower subregion can advantageously have a support region for the coil wire. The support region is designed, for example, in the form of a sloping contour between the upper and the lower subregions, so that the coil wire can rest on it while being wound through. The support region increases the support height of the coil wire, so that drifting of the coil wire in the y-direction (axial direction) is reduced.

In an embodiment, the lower subregion is designed to be narrower than the upper subregion. This means that the legs in the lower subregion have a smaller distance from one another than in the upper subregion. For example, a support region for the coil wire can advantageously be formed at the upper end (viewed in the y-direction or axial direction).

The lower subregion preferably has a groove base.

Further, the lower subregion is adapted to a diameter of a coil wire, preferably so that the width of the lower subregion corresponds to the diameter of the coil wire. When the coil wire is finally pressed into the groove base, a lateral or off-center slipping of the coil wire is no longer possible. A clean and continuous contacting of the coil wire by means of an insulation displacement contact is thus ensured.

The upper and the lower subregions advantageously have oppositely situated legs, the coil wire being fixed by the legs in the lower subregion. In particular, the legs in the lower subregion are elastic. However, it is also conceivable to make the legs of both subregions, or the legs at only one side of each of the lower and/or the upper subregion, elastic.

In a preferred embodiment, the lower subregion has, on the oppositely situated legs, webs which extend up to the groove base. This can be provided for only one, for two, or for any number of contact receiving pocket(s). The upper region of the webs enables a flat coil wire support without tensile stress. A central positioning of the coil wire is advantageously ensured.

In a further development of the invention, the wire guide contours are formed partially circumferentially on the outer surface of the at least one insulating cap. The wire guide contours do not run radially around the entire insulating cap, but are provided primarily in the region of the contact receiving pockets, the deflection domes and partly on the insulating cap. Guidance of the coil wire during winding of the stator and spacing of the individual phase wires is thereby ensured. The wire guide contours are preferably provided in the form of grooves on the outer surface of the contact receiving pockets, the deflection domes, and partly on the insulating cap.

Furthermore, a method for manufacturing a stator of an electric drive unit is provided, wherein the stator comprises a stator core with at least one stator pole, at least one insulating cap on which a plurality of contact receiving pockets is arranged for receiving the coil wire, a number of deflection domes which are arranged and distributed over the circumference of the insulating cap and wire guide contours on the outer circumferential surface of the insulating cap for spacing the coil wire. The plurality of contact receiving pockets has a receiving region for the coil wire, which is designed differently. Furthermore, the plurality of contact receiving pockets comprises at least one deflection balcony. The method is characterized by the following method steps:
   a) fixing a coil wire start on an auxiliary contact support;
   b) inserting the coil wire in the x direction (radial direction) into a first contact receiving pocket, the coil wire being placed on the support region;
   c) leading the coil wire out of the first contact receiving pocket to the first stator pole;
   d) winding a first stator pole and further guiding the continuous coil wire via wire guide contours on the at least one insulating cap to a second contact receiving pocket;
   e) winding through the entire stator core;
   f) fixing a coil wire end on the auxiliary contact support;
   g) lowering a tool preferably in the axial direction down to the at least one deflection balcony at a determined distance from contact receiving pockets that receive the coil wire start and the coil wire end, and cutting through the coil wire start and the coil wire end in front of the contact receiving pockets;
   h) raising the tool in the axial direction;
   i) moving the tool in the radial direction up to a stop point for the tool, and simultaneous pushing of the cut-through coil wire start and coil wire end in the direction of the coil by the tool, up to the stop point of the tool; and
   j) contacting the coil wire in the contact receiving pockets by means of an insulation displacement contact, the receiving region being elastically flexible.

Before the stator core is wound with a coil wire start, the coil wire is fixed on a contact auxiliary support. Fixing in this context can mean holding or temporarily clamping the coil wire, on both sides or on one side.

When the coil wire is inserted in the x-direction into the first contact receiving pocket, it is guided straight in without forming or bending a wire loop, in such a way that a positioning of the wire at a distance from the groove base is ensured. The coil wire thus does not lie on the groove base and is positioned on the support region in the first contact receiving pocket. A straight guiding of the coil wire means in particular a guiding of the coil wire parallel to the legs in the contact receiving pocket, thus avoiding an oblique or off-center positioning of the coil wire.

The coil wire is then guided out of the first contact receiving pocket to the first stator pole. The entry and exit of the coil wire takes place at the entry and exit side of the contact receiving pocket without tensile stress and does not run at an angle in the contact receiving pocket in the y-direction (axial direction). A wire loop is formed at the wire exit of the contact receiving pocket and is guided to the first stator pole. After winding the first stator pole to form a first coil, the continuous coil wire is guided via wire guide contours on the at least one insulating cap to a second contact receiving pocket. The wire guide contours run parallel to each other, so that there is no contact between the coil wires and a short circuit is advantageously prevented.

In a further method step, the entire stator core is wound through, forming the coils, and a coil wire end is fixed on the auxiliary contact support.

In a further method step, a tool is preferably lowered in the axial direction down to the at least one deflection balcony at a determined distance from contact receiving pockets that receive the coil wire start and the coil wire end, and the coil wire start and the coil wire end are cut through in front of the contact receiving pockets.

Here the tool can be designed, for example, as a cutting punch or a blade, but also as a standard cutting tool known to the person skilled in the art.

The cutting through of the coil wire start and the coil wire end takes place in front of the contact receiving pockets, and not in the contact receiving pocket itself. According to the present invention, the coil wire start and the coil wire end are not arranged in a common contact receiving pocket.

After the coil wire start and the coil wire end have been cut through, the tool is raised in the axial direction. The tool is then moved in the radial direction up to a stop point for the tool. Through the movement of the tool, the cut-through coil wire start and the coil wire end are moved simultaneously in the direction of the coil by the tool, up to the stop point of the tool.

The movement of the tool in the axial direction and radial direction and the stop point for the tool are defined and specified as parameters in the tool.

In a concluding method step, the coil wire is contacted in the contact receiving pockets by means of insulation displacement contact, the receiving region being elastically flexible here.

Finally, a suitable insulation displacement contact is inserted into the contact pocket(s) for the electrical contacting of the coil wire. The receiving region of the at least one contact receiving pocket has a support region that is raised in the y-direction (axial direction), preventing a drift of the coil wire in the axial direction.

The receiving region of the contact receiving pockets is designed to be elastically flexible, so that the coil wire takes place during contacting by means of insulation displacement contact without damage or change of cross-section or change in position of the coil wire.

In a further development, the coil wire is guided into and/or out of a contact receiving pocket with a small, preferably acute bending radius in order to form a corresponding wire loop (or wire bow or slack in the wire) with a narrow, preferably acute bending radius at the inlet and exit of the at least one contact receiving pocket. During entry and exit, the coil wire is placed close to the contact pocket, i.e., at a small distance from the contact pocket, while maintaining the necessary wire tensile stress. Due to the close placement of the coil wire, the coil wire is thereby laid with a narrow bending radius.

In one embodiment, after being guided out of the contact receiving pocket, the coil wire is guided via at least one deflection dome and/or at least one deflection balcony to a further contact receiving pocket, or alternatively to a further coil. This ensures optimal guidance of the coil wire during winding.

In a further embodiment, the coil wire start and the coil wire end are fixed by the webs on the oppositely situated legs in the lower subregion when they are cut through by the tool in front of the contact receiving pockets. In front of the contact receiving pockets means the radial outer side of the contact receiving pockets while maintaining a certain distance from the contact receiving pocket.

In a further embodiment, during contacting the coil wire is pressed and fixed onto the groove base within the lower subregion by means of insulation displacement contact in at least one contact receiving pocket. This prevents the coil wire from slipping out of the corresponding contact pocket.

The invention further relates to a pump having a previously disclosed stator of an electric drive unit, in particular an electric motor. Such devices can be used in particular in oil pumps, oil mist separators or in other types of liquid pumps, for example in the automotive field or household appliance sector.

BRIEF DESCRIPTION OF THE SEVERAL VIEWS OF THE DRAWINGS

The invention is explained in more detail on the basis of exemplary embodiments, with reference to the accompanying drawings. In the figures.

DETAILED DESCRIPTION OF THE INVENTION

Figure 1:
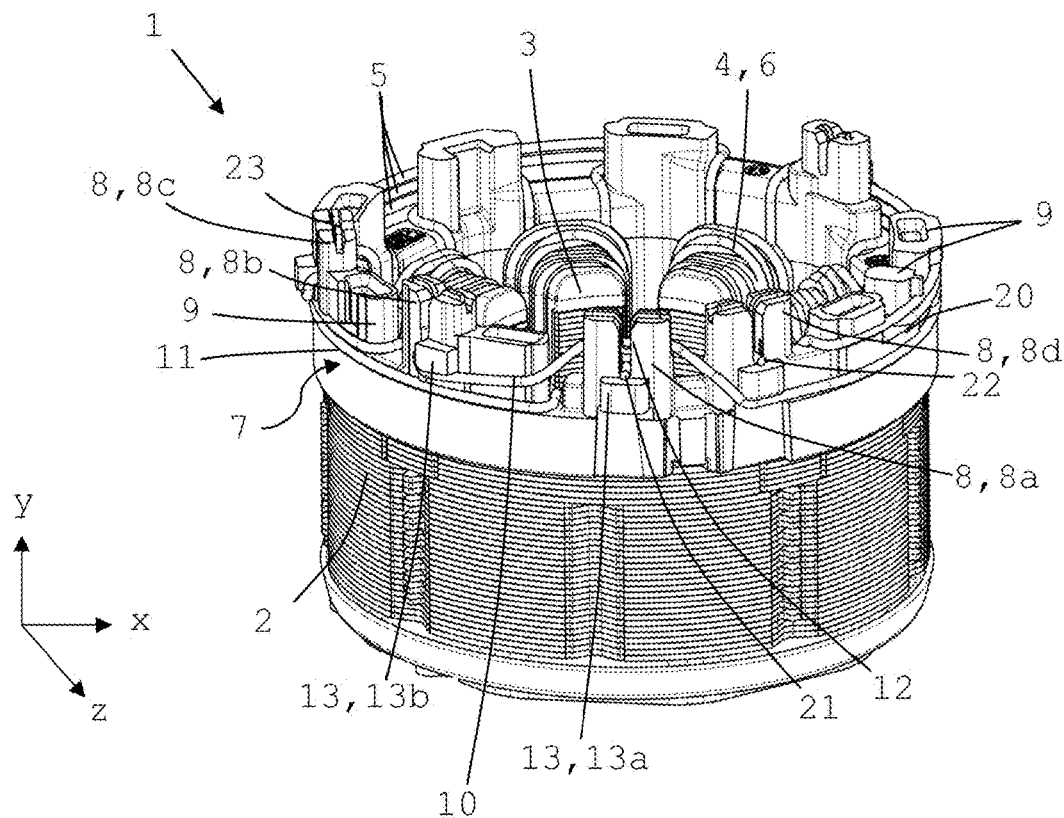
FIG. 1 is a perspective detailed view of the stator according to the invention.

FIG. 1 shows a detailed view of the stator 1 according to the invention for an electric drive unit, in particular an electric motor, comprising a stator core 2 having at least one stator pole 3, a stator winding 4 which forms all the coils 6 from one continuous coil wire 5, at least one insulating cap 7 on which a plurality of contact receiving pockets 8, 8a, 8b, 8c, 8d is arranged for receiving the coil wire 5, a number of deflection domes 9 which are arranged distributed over the circumference of the insulating cap 7, and wire guide contours 10 on the outer peripheral surface 11 of the insulating cap 7 for spacing the coil wire 5. A plurality of the contact receiving pockets 8, 8a, 8b, 8c, 8d has a receiving region 12 for the coil wire 5, which receiving regions are designed differently. At least one deflection balcony 13a, 13b, 13c, 13d is formed on one or both radial outer surfaces 20 of the contact receiving pockets 8, 8a, 8b, 8c, 8d. The coil wire start 21 is fixed on an auxiliary contact support (not shown) and then guided in the x-direction (x), i.e., in the radial direction, into a first contact receiving pocket 8, 8a, the coil wire 5 being placed on the support region 16. The coil wire 5 is then guided out of the first contact receiving pocket 8a to the first stator pole 3, is wound on it, and is then further guided via wire guide contours 10 past the at least one insulating cap 7, at least one deflection dome 9 and/or at least one deflection balcony 13a to a second contact receiving pocket 8b or alternatively to a further coil. After the stator core 2 has been completely wound, the coil wire end 22 is guided out from a contact receiving pocket 8d and is fixed on the auxiliary contact support (not shown). Subsequently, a tool 24 (See FIG. 7)) is preferably lowered in the axial direction down to the at least one deflection balcony 13, 13a, 13b, 13c, 13d at a determined distance from contact receiving pockets 8, 8a, 8b, 8c, 8d that receive the coil wire start 21 and the coil wire end 22, and the coil wire start 21 and the coil wire end 22 are cut through in front of the contact receiving pockets 8, 8a, 8b, 8c, 8d. After the cutting through, the tool 24 is raised in the axial direction. In a further method step, the tool is moved in the radial direction up to a stop point 25 for the tool 24, and the cut coil wire start 21 and the coil wire end 22 are simultaneously pushed in the direction of the coil by the tool 24 up to the stop point 25 of the tool 24. In a last method step, the coil wire 5 is contacted in the contact receiving pockets 8, 8a, 8b, 8c, 8d by means of insulation displacement contact 23, the receiving region 12 being elastically flexible in the process.

Figure 2:
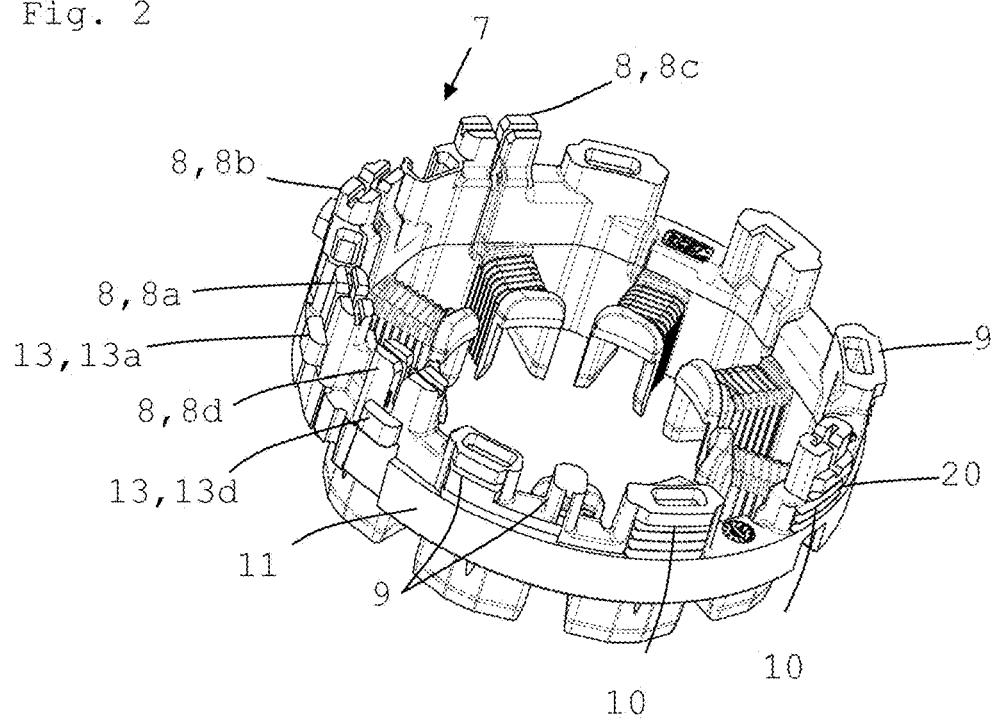
FIG. 2 is a perspective detailed view of the at least one insulating cap according to FIG. 1.

FIG. 2 shows a detailed view of the at least one insulating cap 7 according to FIG. 1, on which a plurality of contact receiving pockets 8, 8a, 8b, 8c, 8d are radially arranged for receiving the coil wire 5, a number of deflection domes 9, which are arranged and distributed over the circumference of the insulating cap 7, and wire guide contours 10 on the outer peripheral surface 11 of the insulating cap 7 for spacing the coil wire 5. The wire guide contours 10 do not run radially around the entire outer surface of the insulating cap 7, but are provided primarily in the region of the contact receiving pockets 8, 8a, 8b, 8c, 8d, the at least one deflection dome 9, and partly on the insulating cap 7. Guidance of the coil wire 5 during winding of the stator 1 and spacing of the individual phase wires is thereby ensured. The wire guide contours 10 are preferably provided in the form of grooves on the outer surface 20 of the contact receiving pockets 8, 8a, 8b, 8c, 8d, of the at least one deflection dome 9 and partly on the insulating cap 7. At least one deflection balcony 13, 13a, 13b, 13c, 13d is formed on a radial inner surface and/or outer surface 20 of the contact receiving pockets 8, 8a, 8b, 8c, 8d. By providing the deflection balconies, the level of the base of the pocket of the wire support (on the support region) is increased relative to the height of the pocket base at the wire entry. The distance to the deflection is increased.

Figure 3:
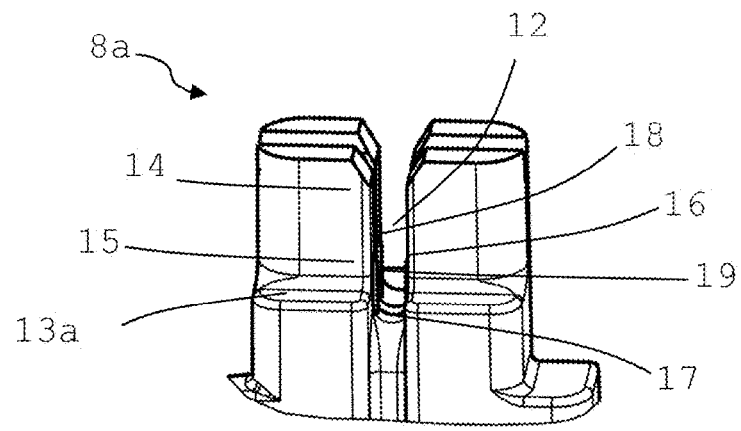
FIG. 3 shows a sectional view of a first contact receiving pocket.

FIG. 3 shows a sectional view of a first contact receiving pocket 8a which is arranged on the insulating cap 7 in an axial direction (y). The receiving region 12 of the first contact receiving pocket 8a comprises an upper 14 and a lower elastic subregion 15. The lower subregion 15 has a groove base 17. The upper 14 and lower subregion 15 have oppositely situated legs 18, so that the coil wire 5 is fixed by the legs 18 in the lower subregion 15. In the first contact receiving pocket 8a, the lower subregion 15 has webs 19 on the oppositely situated legs 18, which webs extend up to the groove base 17 and serve as a support region 16 for the coil wire 5 when the stator core 2 is wound. The coil wire 5 is fixed by the webs 19 and cannot slip out of the contact receiving pocket 8a or slip off-center during the cutting through, which would mean an optimal contacting would no longer be provided. A deflection balcony 13a is formed on the radial outer surface 20 and inner surface of the first contact receiving pocket 8a.

Figure 4:
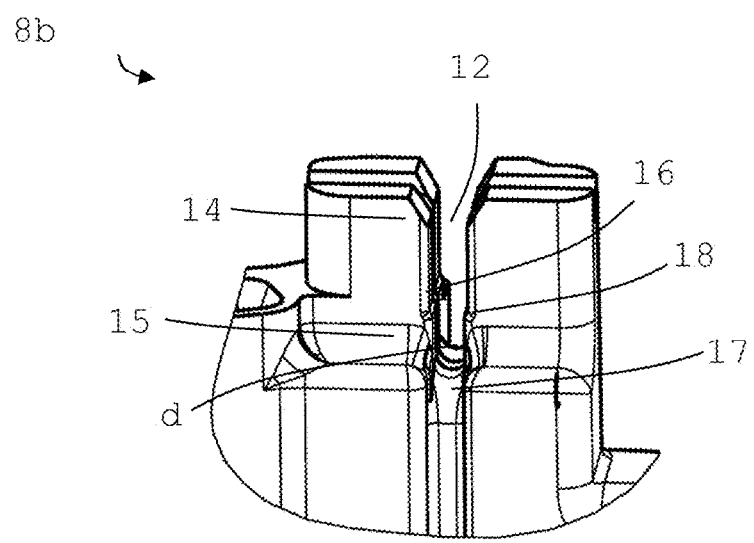
FIG. 4 shows a sectional view of a second contact receiving pocket.

FIG. 4 shows a sectional view of a second contact receiving pocket 8b which is arranged on the insulating cap 7 in an axial direction (y). The receiving region 12 of the second contact receiving pocket 8b comprises an upper 14 and a lower elastic subregion 15. The receiving region 12 has a support region 16 for the coil wire 5 between the upper 14 and the lower subregion 15. The lower subregion 15 has a groove base 17 and is made narrower than the upper subregion 14. Through the tapering of the lower subregion 14, it is adapted to the diameter of the coil wire 5, preferably that the width of the lower subregion 14 corresponds to the diameter (d) of the coil wire 5. The upper 14 and lower subregion 15 have oppositely situated legs 18, the coil wire 5 being fixed by the legs 18 in the lower subregion 14. Here the coil wire 5 is fixed in the narrower lower subregion 14. This enables positionally precise contacting with an insulation displacement contact 23. A deflection balcony 13b (not shown here) is formed on an outer surface 20 of the second contact receiving pocket 8b.

Figure 5:
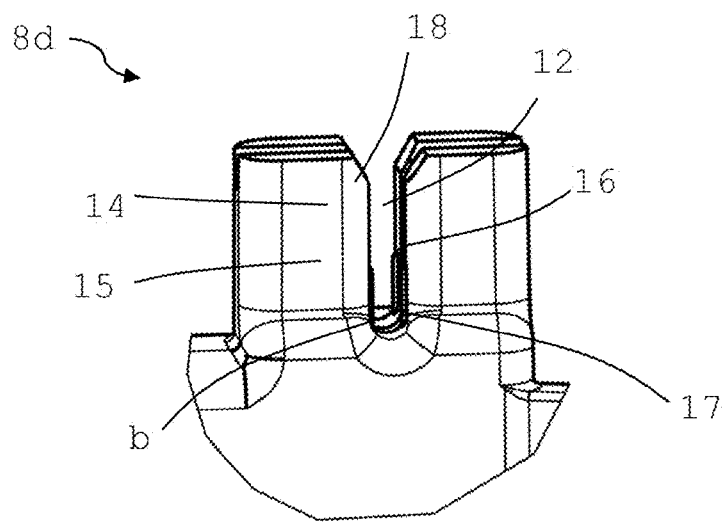
FIG. 5 shows a sectional view of a further contact receiving pocket.

FIG. 5 shows a sectional view of a further contact receiving pocket 8d which is arranged on the insulating cap 7 in an axial direction (y). The receiving region 12 of the further contact receiving pocket 8d comprises an upper 14 and a lower elastic subregion 15. The lower subregion 15 has a groove base 17. The upper 14 and lower subregion 15 have oppositely situated legs 18, so that the coil wire 5 is fixed by the legs 18 in the lower subregion 15. In the further contact receiving pocket 8d, the lower subregion 15 has webs 19 on the oppositely situated legs 18, which webs extend up to the groove base 17 and serve as a support region 16 for the coil wire 5 when the stator core 2 is wound. The coil wire 5 is fixed by the webs 19 (Similar to FIG. 3) and cannot slip out of the contact receiving pocket 8d or slip off-center after the cutting through, which would mean an optimal contacting would no longer be provided. A deflection balcony 13d (not shown here) is formed on the radial outer surface 20 of the further contact receiving pocket 8d.

Figure 6:
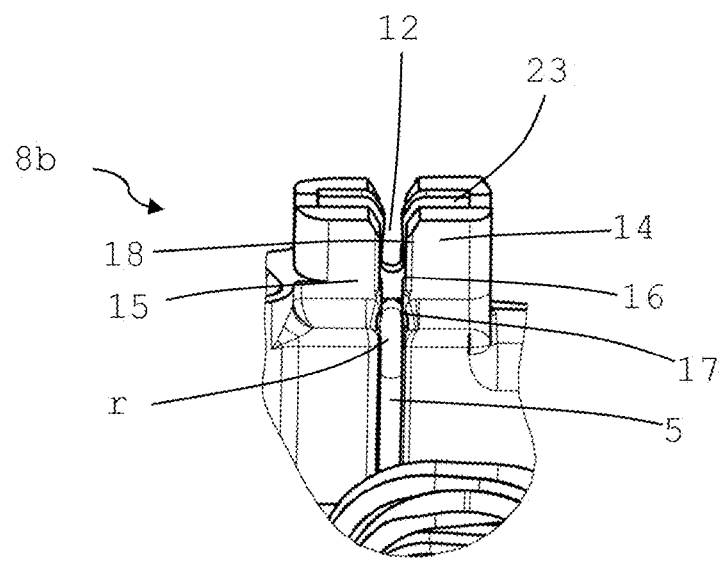
FIG. 6 shows a detailed view of the second contact receiving pocket according to FIG. 4.

FIG. 6 shows a detail of a second contact receiving pocket 8b according to FIG. 4, which is arranged on the insulating cap 7 in an axial direction (y). The receiving region 12 of the second contact receiving pocket 8b comprises an upper 14 and a lower elastic subregion 15. The receiving region 12 has a support region 16 for the coil wire between the upper 14 and the lower subregion 15. The lower subregion 15 has a groove base 17 and is made narrower than the upper subregion 14. Through the tapering of the lower subregion 14, it is adapted to the diameter of the coil wire 5, preferably that the width of the lower subregion 14, which corresponds to the diameter (d) of the coil wire 5. The upper 15 and lower subregion 14 have oppositely situated legs 18, the coil wire 5 being fixed by the legs 18 in the lower subregion 14. Here the coil wire 5 is fixed in the narrower lower subregion 14. This enables positionally precise contacting with an insulation displacement contact 23. A deflection balcony 13b (FIG. 1) is formed on an outer surface 20 of the second contact receiving pocket 8b. The coil wire 5 is guided into and/or out of at least one contact receiving pocket 8a, 8b, 8c, 8d with a small, preferably acute, bending radius (r).

Figure 7:
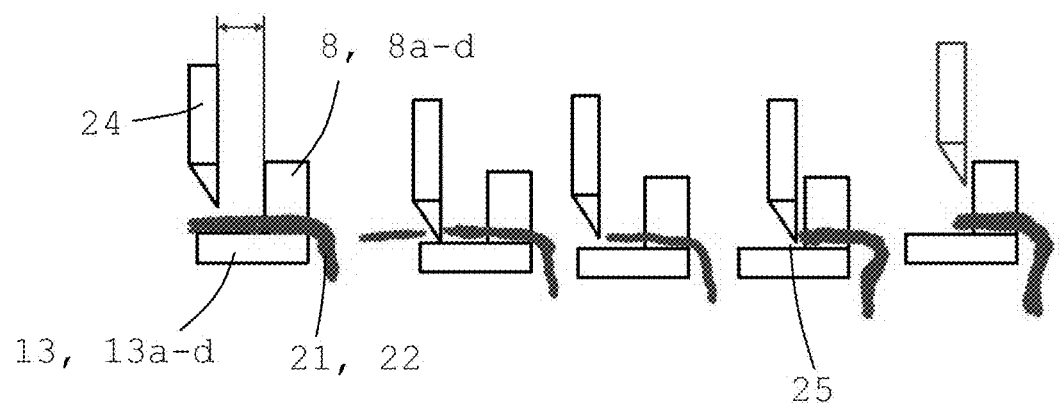
FIG. 7 shows a flowchart during the cutting through of the coil wire start and coil wire end.

FIG. 7 shows a flowchart during the cutting through of the coil wire start 21 and coil wire end 22. After the stator core 2 has been completely wound, the coil wire end 22 is fixed on the auxiliary contact support. A tool 24 is preferably lowered in the axial direction down to the at least one deflection balcony 13, 13a, 13b, 13c, 13d at a determined distance from contact receiving pockets 8, 8a, 8b, 8c, 8d that receive the coil wire start 21 and the coil wire end 22, and the coil wire start 21 and the coil wire end 22 are cut through in front of the contact receiving pockets 8, 8a, 8b, 8c, 8d. The at least one deflection balcony 13, 13a, 13b, 13c, 13d acts here as a cutting support for the tool 24. Before the cutting, the coil wire is under tensile stress, the coil wire start and the coil wire end are fixed on the auxiliary contact support. After the cutting through, the tool 24 is raised in the axial direction. The coil wire now no longer has any tensile stress, and relaxes. In a further method step, the tool is moved in the radial direction up to a stop point 25 for the tool 24, and the relaxed coil wire start 21 and the relaxed coil wire end 22 are simultaneously pushed in the direction of the coil by the tool 24 up to the stop point 25 of the tool 24. Due to the displacement of the relaxed coil wire start 21 and the coil wire end 22 by the tool 24 in the direction of the coil, the coil wire start 21 and the coil wire end 22 form a slack in the wire (wire loop). In a last method step, the coil wire 5 is contacted in the contact receiving pockets 8, 8a, 8b, 8c, 8d by means of insulation displacement contact 23 (not shown here), the receiving region 12 being elastically flexible in the process. The coil wire start 21 and the coil wire end 22 protrude from the contact receiving pocket 8, 8a, 8b, 8c, 8d after contacting by means of insulation displacement contact 23.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Stator
2 Stator core
3 Stator pole
4 Stator winding
5 Coil wire
6 Coil
7 Insulating cap
8, 8a, 8b, 8c, 8d Contact receiving pocket
9 Deflection dome
10 Wire guidance contour
11 Outer peripheral surface insulating cap
12 Receiving region
13, 13a, 13b, 13c, 13d Deflection balcony
14 Upper subregion
15 Lower subregion
16 Support region
17 Groove base
18 Leg
19 Web
20 Outer surface of contact receiving pocket
21 Coil wire start
22 Coil wire end
23 Insulation displacement contact
24 Tool
25 Tool attachment point
d Diameter of the coil wire
x x direction (radial direction)
y y direction (axial direction)

z z direction
r Bending radius

What is claimed is:

1. A method for manufacturing a stator of an electric drive unit having a stator core and at least one stator pole; at least one insulating cap on which a plurality of contact receiving pockets is arranged for receiving the coil wire; a number of deflection domes which are distributed over the circumference of the insulating cap and wire guide contours on the outer circumferential surface of the insulating cap for spacing the coil wire, wherein the plurality of contact receiving pockets each have a receiving region for the coil wire, which receiving regions are designed differently; and wherein the plurality of contact receiving pockets comprises at least one deflection balcony;

characterized by the following method steps:
a) fixing the starting end of a coil wire start on an auxiliary contact support;
b) inserting the coil wire in a first direction into a first contact receiving pocket, wherein the coil wire is placed onto the support region;
c) guiding the coil wire out from the first contact receiving pocket to the first stator pole;
d) winding a first stator pole and further guiding the continuous coil wire via wire guide contours on the at least one insulating cap to a second contact receiving pocket;
e) winding the entire stator core;
f) fixing a coil wire end on the auxiliary contact support;
g) lowering a tool in the axial direction of the stator down to the at least one deflection balcony at a determined distance from contact receiving pocket, which receives the coil wire start and the coil wire end and cutting through the coil wire start and the coil wire end in front of the contact receiving pockets;
h) lifting the tool in the axial direction;
i) moving the tool in the radial direction of the stator up to a stop point for the tool and simultaneous pushing of the cut-through coil wire start and coil wire end in the direction of the coil by the tool up to the stop point of the tool; and
j) contacting the coil wire in the contact receiving pockets by means of an insulation displacement contact, wherein the receiving region is elastically flexible in the process.

2. The method according to claim 1, wherein the coil wire is guided into and/or out of at least one contact receiving pocket with a small, preferably pointed, bending radius (r).

3. The method according to claim 1, characterized in that, after being guided out of the contact receiving pocket, the coil wire is guided via at least one deflection dome and/or at least one deflection balcony to a further contact receiving pocket or alternatively to a further coil.

4. The method according to claim 1, characterized in that during the cutting by the tool the coil wire start and the coil wire end are fixed in the lower subregion in front of the contact receiving pockets by the webs on the oppositely situated legs.

5. The method according to claim 1, characterized in that during the contacting by means of insulation displacement contact the coil wire is pressed and fixed onto the groove base in at least one contact receiving pocket within the lower subregion.

6. A stator for an electric drive unit produced by the method for manufacturing a stator according claim 1, the stator comprising:
a stator core having at least one stator pole;
a stator winding which forms all the coils from one continuous coil wire;
at least one insulating cap having a circumference on which insulating cap a plurality of contact receiving pockets are arranged for receiving the coil wire;
a number of deflection domes which are distributed over the circumference of the insulating cap and wire guide contours on the outer circumferential surface of the insulating cap for spacing the coil wire;
each of the plurality of contact receiving pockets having a receiving region for the coil wire, each of the receiving regions being designed differently from at least one of the other receiving regions; and wherein the plurality of contact receiving pockets comprise at least one deflection balcony.

7. The stator according to claim 6, wherein each of the receiving regions of the contact receiving pockets comprises an upper and a lower elastic subregion.

8. The stator according to claim 7, wherein the receiving region between the upper and the lower subregion has a support region for the coil wire.

9. The stator according to claim 7, wherein the lower subregion is made narrower than the upper subregion.

10. The stator according to claim 7, wherein the lower subregion has a groove base.

11. The stator according to claim 7, wherein the upper and lower subregions have oppositely situated legs, and the coil wire is fixed by the legs in the lower subregion.

12. The stator according to claim 7, wherein the lower subregion further comprises oppositely situated limbs, wherein on the oppositely situated limbs, webs extend up to the groove base.

13. The stator according to claim 6, wherein the lower subregion is adapted to a diameter (d) of the coil wire, and the width (b) of the lower subregion corresponds to the diameter (d) of the coil wire.

14. The stator according to claim 6, wherein the wire guide contours are formed partially circumferentially on the outer surface of the at least one insulating cap.

15. A pump having an electric drive unit comprising a stator produced by the method for manufacturing a stator according claim 1.

* * * * *